No. 623,157. Patented Apr. 18, 1899.
D. E. HUNTER.
BASE FOR TRAVELING BOOKCASES.
(Application filed May 17, 1898.)
(No Model.)
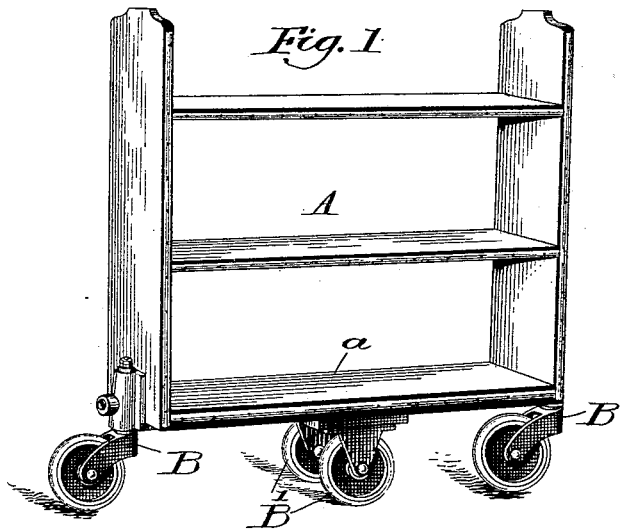
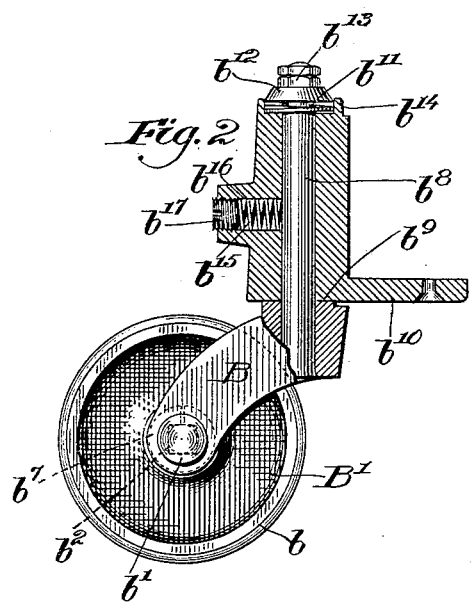
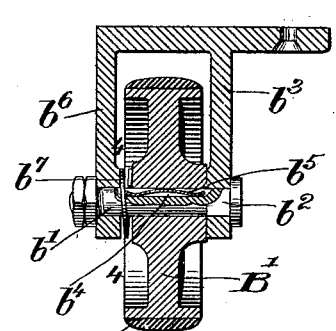
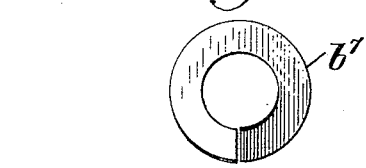
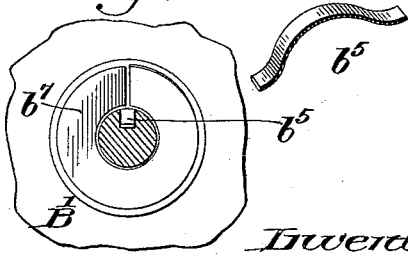
Witnesses:
A.C. Harwood
James M. Urquhart
Inventor.
David E. Hunter.
by Crosby & Gregory
attys.
THE NORRIS PETERS CO., PHOTO-LITHO., WASHINGTON, D. C.

UNITED STATES PATENT OFFICE.

DAVID E. HUNTER, OF CAMBRIDGE, MASSACHUSETTS.

BASE FOR TRAVELING BOOKCASES.

SPECIFICATION forming part of Letters Patent No. 623,157, dated April 18, 1899.

Application filed May 17, 1898. Serial No. 680,926. (No model.)

*To all whom it may concern:*

Be it known that I, DAVID E. HUNTER, of Cambridge, county of Middlesex, and State of Massachusetts, have invented an Improvement in Bases for Traveling Bookcases, of which the following description, in connection with the accompanying drawings, is a specification, like letters on the drawings representing like parts.

The usual book-trucks as frequently provided for delivering books in large libraries occasion extreme inconvenience and annoyance on account of the rattling of the wheels and casters which support the truck or portable bookcase. This source of annoyance produces frequent complaints both from the library authorities and from the readers in such libraries. Accordingly I have invented the improved base, as hereinafter more fully explained, whereby these portable bookcases are rendered absolutely noiseless.

In the drawings I have shown a preferred embodiment of my invention.

Figure 1 is a perspective view of a truck provided with my improved base. Fig. 2 is a sectional detail showing one of the casters enlarged; Fig. 3, a transverse sectional view of one of the main supporting-wheels. Fig. 4 is a transverse section thereof on the line 4 4. Fig. 5 is a perspective view of the spring employed in the supporting-wheel; and Figs. 6 and 7 show in plan and edge elevation the spring employed to prevent endwise rattling.

The truck or bookcase A may be and is of any usual or preferred form and is provided at its base $a$ with similar forward and rear casters B and central supporting-wheels B'. These wheels and casters are arranged so that when the shelves are exactly horizontal the entire weight of the load is carried by the supporting-wheels alone, the caster-wheels being then slightly raised from the floor, this provision being made in order that the truck may be readily passed over slight elevations, such as a threshold.

As heretofore constructed the wheels B' have had more or less lateral and vertical play, so that especially when the truck was heavily loaded a considerable rattling of these wheels would take place, particularly if the truck were being rolled over a more or less uneven floor, such as the mosaic-stone floors frequently found in public libraries, and also the front and rear caster-wheels have produced various disagreeable rattling noises on account of the lateral and longitudinal play of their supporting swiveling spindle in addition to the noises produced by the lateral and vertical movements of the wheels on their axles.

Viewing Figs. 2 and 3, it will be seen that the wheels B and B', provided with usual rubber tires $b$, are mounted on stationary axles, shown in dotted lines in Fig. 2 and in full lines in Fig. 3 as a bolt $b'$, held against rotation by any suitable means, its head being shown herein as square at $b^2$ to enter a similar cavity in the hanger $b^3$. This bolt is recessed at $b^4$ in its upper side to receive a spring or other resilient member $b^5$. This spring need not be very strong, but is merely sufficient to maintain the wheel in its natural position against the under side of the axle $b'$, thereby effectually preventing any rattling from that source.

Between the hub of the wheel and the adjacent hanger, either $b^6$ or $b^3$, as preferred, I interpose a washer-spring $b^7$, (shown in detail in Figs. 6 and 7,) this spring being sufficiently strong to hold the wheel firmly against the opposite bearing, so that it cannot rattle on account of any endwise shocking or moving tendency. The spindle $b^8$ of the caster is similarly held up against the bearing-surface $b^9$ of its hanger bracket or journal $b^{10}$ by means of a spring-washer $b^{11}$, interposed between the journal-bearing and a washer $b^{12}$, held by nuts $b^{13}$ on the spindle, shoulders $b^{13}$ preferably concealing the spring $b^{11}$, and a compression-spring $b^{15}$ in a hollow boss $b^{16}$ is held by a plug $b^{17}$ firmly against the spindle $b^8$, thereby preventing any rattling movement thereof. The result is that the truck is perfectly noiseless as it runs over the floor, no matter how heavily loaded. So far as I am aware this has never been accomplished before.

By the term "spring cushioning device" in the claims I do not intend to restrict myself to a metal spring, but I mean any springing or resilient means for accomplishing the purpose.

I am aware that there have been various kinds of spring-held casters, but none of them have been capable of operating as mine operates, the most of them having the springs or equivalent devices so arranged that instead of holding the lower bearing of the spindle against its journal they have held the upper bearing against the journal, the result being that the rattling has been increased instead of diminished, because every time the load was removed or partly removed from the caster its upper bearing has been forcibly clicked against the journal, not only by the force of gravity, but by the propelling power of the spring.

While I have herein shown a preferred embodiment of my invention, I do not intend to restrict myself thereto, inasmuch as various changes in location and arrangement of parts as well as in the form and kind of cushioning device may be employed without departing from the spirit and scope of my invention.

Having fully described my invention, what I claim as new, and desire to secure by Letters Patent, is—

1. A portable bookcase, provided at its base with supporting-wheels adapted normally to support the weight of the case, and at its opposite ends with casters, and means maintaining the lower spindle-bearings of said casters in constant engagement with their journals, whereby vertical movement thereof is prevented, substantially as described.

2. A portable bookcase, provided at its base with central supporting-wheels, and at its ends with casters, combined with cushioning devices for preventing lateral and vertical rattling movement of the respective wheels in their bearings, substantially as described.

3. A portable bookcase, provided at its base with central supporting-wheels, and at its ends with casters, combined with cushioning devices for preventing lateral and vertical rattling movement of the respective wheels in their bearings, and cushioning devices for preventing vertical and lateral rattling movement of the spindles of said casters and their bearings, substantially as described.

4. As an article of manufacture, the combination with a hanger, a horizontal axle therein, a wheel mounted to turn on said axle, and a spring cushioning device carried by said axle on the upper side thereof and engaging the inner bearing-surfaces of the wheel for preventing vertical rattling movement thereof, substantially as described.

5. As an article of manufacture, the combination with a hanger, a horizontal axle therein, a wheel mounted on said axle, and a spring cushioning device carried by said axle and engaging the inner bearing-surface of the wheel maintaining the inner bearing-surface of said wheel in constant engagement with the under side of said axle for preventing vertical movement thereof, and a spring cushioning device at one end of the hub of said wheel, maintaining the latter in constant engagement with the opposite end bearing, thereby preventing lateral movement thereof, substantially as described.

6. As an article of manufacture, a bookcase-caster having its wheel journal horizontally in a hanger and provided between said hanger and the hub of the wheel with a spring cushioning device, and between the axle of the wheel and the inner bearing-surface of the latter with another spring cushioning device, and having its spindle vertically journaled in a suitable hanger and provided above the lower bearing of said spindle with a spring cushioning device, maintaining said lower bearing in constant engagement with the adjacent hanger, substantially as described.

7. As an article of manufacture, a bookcase-caster having its spindle journaled to turn in a suitable bracket or hanger, and provided with means holding the lower bearing of said spindle in constant engagement with said bracket, substantially as described.

8. As an article of manufacture, a bookcase-caster having its spindle journaled to turn in a suitable bracket or hanger, and provided with means holding the lower bearing of said spindle in constant engagement with said bracket, and means bearing on one side of said spindle holding the latter in constant engagement with the opposite side of its journal-bearing, substantially as described.

9. As an article of manufacture, a bookcase-caster having its spindle journaled to turn in a suitable bracket or hanger, and provided at its upper end with a spring cushioning device held under compression between said spindle and the upper end of said bracket, substantially as described.

10. As an article of manufacture, a bookcase-caster having its spindle journaled to turn in a suitable bracket or hanger, said hanger being recessed adjacent said spindle, and a spring cushioning device held under compression within said recess bearing against said spindle, substantially as described.

In testimony whereof I have signed my name to this specification in the presence of two subscribing witnesses.

DAVID E. HUNTER.

Witnesses:
GEO. H. MAXWELL,
J. S. LOCKWOOD.